No. 747,025. PATENTED DEC. 15, 1903.
A. M. WHITE.
NURSING BOTTLE.
APPLICATION FILED MAR. 17, 1903.
NO MODEL.
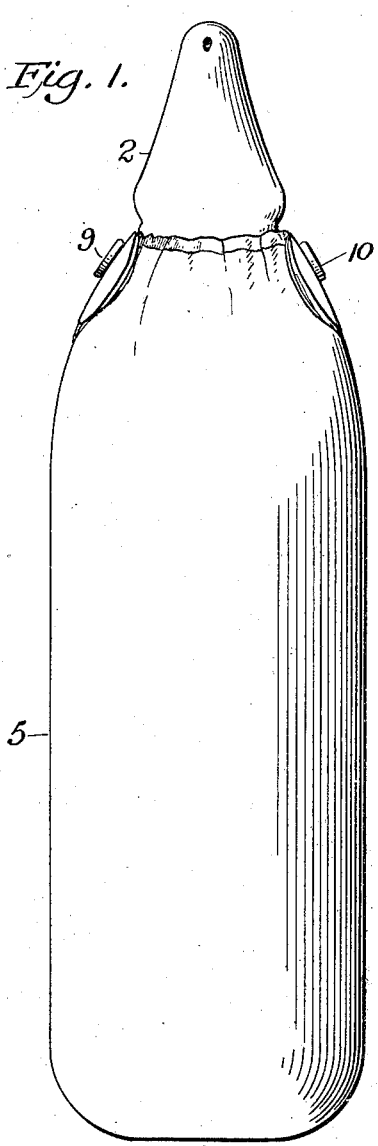
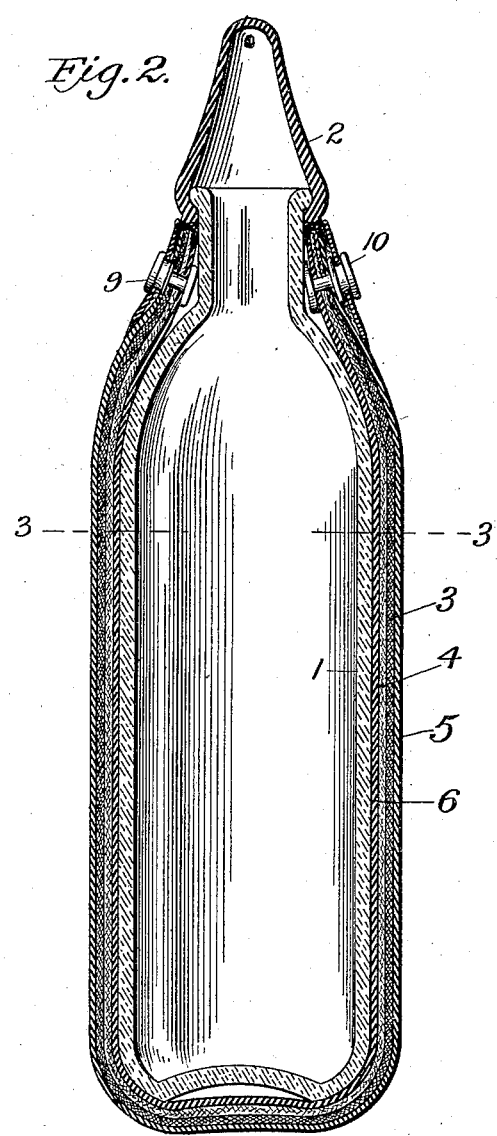
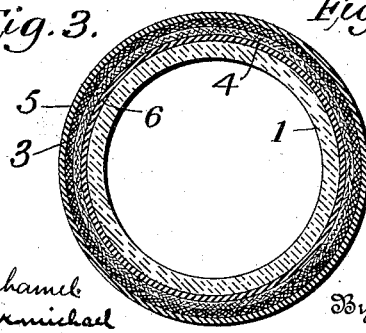
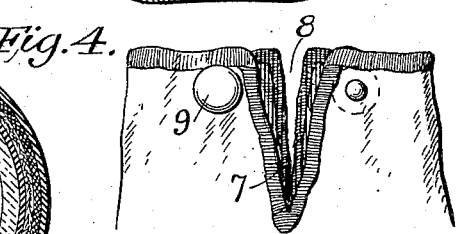
Witnesses
James P. Duhamel
Emma L. Carmichael
Inventor
Anna M. White
By her Attorney
Nicholas M. Goodlett Jr.
THE NORRIS PETERS CO., PHOTO-LITHO., WASHINGTON, D. C.

No. 747,025. Patented December 15, 1903.

UNITED STATES PATENT OFFICE.

ANNA M. WHITE, OF HASBROUCK HEIGHTS, NEW JERSEY.

NURSING-BOTTLE.

SPECIFICATION forming part of Letters Patent No. 747,025, dated December 15, 1903.

Application filed March 17, 1903. Serial No. 148,169. (No model.)

*To all whom it may concern:*

Be it known that I, ANNA M. WHITE, a citizen of the United States, and a resident of Hasbrouck Heights, in the county of Bergen and State of New Jersey, have invented new and useful Improvements in Nursing-Bottles, of which the following is a specification.

This invention relates to nursing-bottles for infants; and it seeks to provide a nursing-bottle so arranged and constructed as to prevent the temperature of the heated milk or other food during the period of feeding from falling to such temperature as would endanger the infant's health. An infant fed at the breast receives its milk and all of it at a uniform temperature of about 98° Fahrenheit. On the other hand, with the nursing-bottles now in general use the temperature of the milk rapidly falls during the feeding period, so that much of the milk, although initially at the proper temperature, is taken into the stomach at a much lower temperature. This has been found to be a prolific cause of stomach troubles among infants, which in many cases have had most serious results. The feeding period varies of course with different infants, and it widely varies at different times with the same infant. It not infrequently happens that half an hour and more has elapsed after the milk is prepared and before it is all consumed.

Prior to this invention there has been no satisfactory way of overcoming the defects of the nursing-bottles now in general use—that is, so that the milk shall be reliably kept up to the proper temperature.

The invention consists of the features and combinations thereof hereinafter set forth.

In the accompanying drawings, in which one of the various embodiments of the invention is shown, Figure 1 is a side elevation of one embodiment of the invention. Fig. 2 is a central vertical sectional elevation thereof. Fig. 3 is a sectional plan view on the line 3 3 of Fig. 2, and Fig. 4 is a side elevation showing the upper end of the covering for the bottle.

Referring now to the details as specifically shown in the drawings, 1 is a nursing-bottle, which may be formed of glass or other suitable material and which may be of any suitable size or shape.

2 is an ordinary detachable rubber nipple.

The bottle is incased in a removable and replaceable covering consisting of a sheath of felt 3 and a sheath of asbestos 4.

5 and 6 are exterior and interior layers of suitable non-absorbent material which inclose the felt and asbestos. Any suitable non-absorbent material may be used, but rubber cloth is preferred. The felt and asbestos are non-heat-conducting materials. If desired, other suitable non-heat-conducting materials may be employed. Moreover, either the felt or the asbestos sheath may be used alone without the other; but I prefer to use felt in constructing the non-heat-conducting sheath.

The layers of the covering may be secured together in any suitable way, and the covering may be formed in various ways to enable it to be readily removed and replaced. As shown in the drawings, the covering is formed with two slits 7 and 8 extending down a short way from the top to permit the mouth of the covering to spread, so that the bottle may be readily removed. These slits are closed by buttons 9 and 10, which are fastened when the covering is in place in the bottle.

It will be understood, of course, that various means may be employed for securing the covering in place or for closing the slits 7 and 8.

A non-heat-conducting material or materials, such as 3 and 4, of course enables the heated milk or other food to retain its proper temperature during the feeding period. The non-absorbent casing, such as the rubber cloth 5 and 6, preserves the non-heat-conducting material from damage, especially such as would be due to water or milk, and, furthermore, enables the covering to be washed and kept thoroughly clean and sanitary. Another advantage of the covering is that it protects the bottle from damage, such as would otherwise result if the bottle were dropped or subjected to blows. If the bottle is made of glass, as is usually the case, the covering will save the bottle from breakage.

What I claim, and desire to secure by Letters Patent, is—

1. A nursing-bottle provided with a removable and replaceable covering having an integral surrounding wall and including in its structure a sheath of non-heat-conducting material, and a casing of non-absorbent material inclosing said sheath on both sides, substantially as and for the purpose set forth.

2. A nursing-bottle provided with a removable and replaceable covering having an integral surrounding wall and including in its structure a sheath of felt and a casing of rubber cloth inclosing said felt on both sides, substantially as and for the purpose set forth.

3. A nursing-bottle provided with a removable and replaceable covering having an integral surrounding wall and including in its structure a sheath of non-heat-conducting material, and a casing of non-absorbent material inclosing said sheath on both sides, said covering having an expansible and contractible mouth through which the bottle may be extracted and inserted, substantially as and for the purpose set forth.

4. A nursing-bottle provided with a removable and replaceable covering having an integral surrounding wall and including in its structure a sheath of felt and a casing of rubber cloth inclosing said felt on both sides, said covering having an expansible and contractible mouth through which the bottle may be extracted and inserted, substantially as and for the purpose set forth.

5. A nursing-bottle provided with a removable and replaceable covering having an integral surrounding wall and including in its structure a sheath of non-heat-conducting material, and a casing of non-absorbent material inclosing said sheath on both sides, said covering having a mouth provided with one or more slits and means to fasten the same, so as to permit the ready extraction and insertion of the bottle, substantially as and for the purpose set forth.

6. A covering for a bottle provided with a removable and replaceable covering having an integral surrounding wall and including in its structure a sheath of non-heat-conducting material, and a casing of non-absorbent material inclosing said sheath on both sides, substantially as and for the purpose set forth.

7. A covering for a bottle provided with a removable and replaceable covering having an integral surrounding wall and including in its structure a sheath of non-heat-conducting material, and a casing of non-absorbent material inclosing said sheath on both sides, said covering having an expansible and contractible mouth through which the bottle may be extracted and inserted, substantially as and for the purpose set forth.

In testimony whereof I have signed my name to this specification in the presence of two subscribing witnesses.

ANNA M. WHITE.

Witnesses:
WM. H. ROBERTS,
JOHN H. WHITE.